(12) United States Patent
Yoon

(10) Patent No.: US 9,371,886 B2
(45) Date of Patent: Jun. 21, 2016

(54) DUAL MASS FLYWHEEL

(71) Applicant: HYUNDAI MOTOR COMPANY, Seoul (KR)

(72) Inventor: Je Yong Yoon, Bucheon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/560,901

(22) Filed: Dec. 4, 2014

(65) Prior Publication Data
US 2016/0084344 A1 Mar. 24, 2016

(30) Foreign Application Priority Data
Sep. 22, 2014 (KR) .......................... 10-2014-0125773

(51) Int. Cl.
| F16F 15/12 | (2006.01) |
| F16F 15/134 | (2006.01) |
| F16F 15/139 | (2006.01) |

(52) U.S. Cl.
CPC ......... *F16F 15/13469* (2013.01); *F16F 15/139* (2013.01); *F16F 15/13438* (2013.01)

(58) Field of Classification Search
CPC ..................... F16F 15/13469; F16F 15/13438; F16F 15/139; F16F 15/1421; F16F 15/133; F16F 15/1333; F16F 15/1338; Y10T 74/2131; Y10T 74/213
See application file for complete search history.

(56) References Cited

U.S. PATENT DOCUMENTS

| 5,218,884 | A | * | 6/1993 | Rohrle | ............... | F16F 15/13453 |
| | | | | | | 192/205 |
| 5,562,542 | A | * | 10/1996 | Rohrle | ............... | F16F 15/13438 |
| | | | | | | 464/63.1 |
| 7,297,064 | B2 | * | 11/2007 | Jackel | ............... | F16F 1/08 |
| | | | | | | 464/67.1 |
| 7,481,132 | B2 | * | 1/2009 | Mende | ............... | F16F 15/13453 |
| | | | | | | 74/574.3 |
| 8,057,311 | B2 | * | 11/2011 | Boelling | ............. | F16F 15/1234 |
| | | | | | | 464/68.92 |
| 8,303,424 | B2 | * | 11/2012 | Boelling | ........... | F16F 15/13438 |
| | | | | | | 192/205 |
| 2012/0031225 | A1 | | 2/2012 | Fafet et al. | | |
| 2012/0048057 | A1 | | 3/2012 | Fafet et al. | | |
| 2014/0157947 | A1 | | 6/2014 | Oh et al. | | |
| 2015/0276012 | A1 | * | 10/2015 | Kawazoe | .......... | F16F 15/13484 |
| | | | | | | 464/68.2 |

FOREIGN PATENT DOCUMENTS

| JP | 63-66625 U | 5/1988 |
| JP | 2001-317610 A | 11/2001 |
| KR | 10-1011111 B1 | 1/2011 |
| KR | 10-2011-0101235 A | 9/2011 |
| KR | 10-1200677 B1 | 11/2012 |
| KR | 10-2014-0073315 A | 6/2014 |

* cited by examiner

*Primary Examiner* — Adam D Rogers
(74) *Attorney, Agent, or Firm* — McDermott Will & Emery LLP

(57) ABSTRACT

A dual mass flywheel includes a first arcspring and a second arcspring being symmetrically mounted along an inner circumference of a primary cover connected to a crankshaft, a flange being inserted into the primary cover and including a first compressor and a second compressor formed therein, which contact the first arcspring and the second arcspring, respectively, a first stopper and a second stopper configured to support the first arcspring or the second arcspring and being formed on the inner circumference of the primary cover, and a first guide shell and a second guide shell disposed on the inner circumference of the primary cover, guide deformation of the first arcspring or the second arcspring in a radial direction, and including a friction inductor that contacts the first compressor or the second compressor.

5 Claims, 6 Drawing Sheets

DUAL MASS FLYWHEEL

CROSS-REFERENCE TO RELATED APPLICATION

This application is based on and claims the benefit of priority to Korean Patent Application No. 10-2014-0125773, filed on Sep. 22, 2014 in the Korean Intellectual Property Office, the disclosure of which is incorporated herein in its entirety by reference.

TECHNICAL FIELD

The present disclosure relates to a dual mass flywheel, and more particularly, to a dual mass flywheel for preventing an arcspring from being compressed due to torque generated in an engine and preventing the arcspring from being damaged.

BACKGROUND

In general, a flywheel is disposed between an engine and a transmission in order to prevent torsional vibration generated in a crankshaft of the engine. Recently, a dual mass flywheel having a wide damping area has been gradually used in order to reduce noise, vibration, hastiness (N.V.H).

In general, a dual mass flywheel includes a primary wheel 1 connected to a crankshaft, an arcspring 2 included in the primary wheel 1, a flange 3 for receiving rotator power of the crankshaft from the arcspring 2, and a secondary wheel (not shown) secured to the flange 3, as shown in FIG. 1.

According to rotation of an engine, torque is transmitted to the flange 3 and the secondary wheel and the flange 3 and the secondary wheel rotate. The flange 3 compresses the arcspring 2 and compression and tension of the arcspring 2 are repeated according to torque change.

The arcspring 2 needs to be designed to have appropriate a stiffness for an engine torque. This is because a region A of a graph of FIG. 1 is an operating region of the arcspring 2 and the operating region is affected by the stiffness of the arcspring 2.

In particular, coils of the arcspring 2 contact each other and thus the arcspring 2 reaches a limit at which the arcspring 2 is not capable of being compressed any more. In this case, the applied torque is referred to as an end torque.

According to a driving condition, a sharply high torque may be generated. In this regard, when torque reaches the end torque at which the arcspring 2 is not capable of being compressed any more over an operating region of the arcspring 2, an impact is generated to excessively impact coils of the arcspring 2 on each other, and in this case, the arcspring 2 is damaged due to the impact (refer to FIG. 2).

SUMMARY

The present disclosure has been made to solve the above-mentioned problems occurring in the prior art while advantages achieved by the prior art are maintained intact.

An aspect of the present disclosure provides a dual mass flywheel for applying driving resistance to rotation of a flange immediately before a point of time of maximum compression of an arcspring so as to prevent impact from being generated to excessively impact coils of the arcspring on each other.

According to an exemplary embodiment of the present disclosure, a dual mass flywheel includes a first arcspring and a second arcspring configured being symmetrically mounted along an inner circumference of a primary cover connected to a crankshaft, a flange configured being inserted into the primary cover and including a first compressor and a second compressor formed therein, which contact the first arcspring and the second arcspring, respectively, a first stopper and a second stopper configured to support the first arcspring or the second arcspring and being formed on the inner circumference of the primary cover, and a first guide shell and a second guide shell disposed on the inner circumference of the primary cover, guide deformation of the first arcspring or the second arcspring in a radial direction, and including a friction inducer that contacts the first compressor or the second compressor.

The friction inducer may have a thickness that is gradually increased from one end of the first guide shell or the second guide shell toward the other end. In addition, the first guide shell or the second guide shell may have an internal surface with an oval shape.

The friction inducer may protrude toward a center of the primary cover from the first guide shell or the second guide shell. In addition, the friction inducer may protrude from a predetermined portion of the first guide shell or the second guide shell, which is adjacent to the first stopper or the second stopper.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
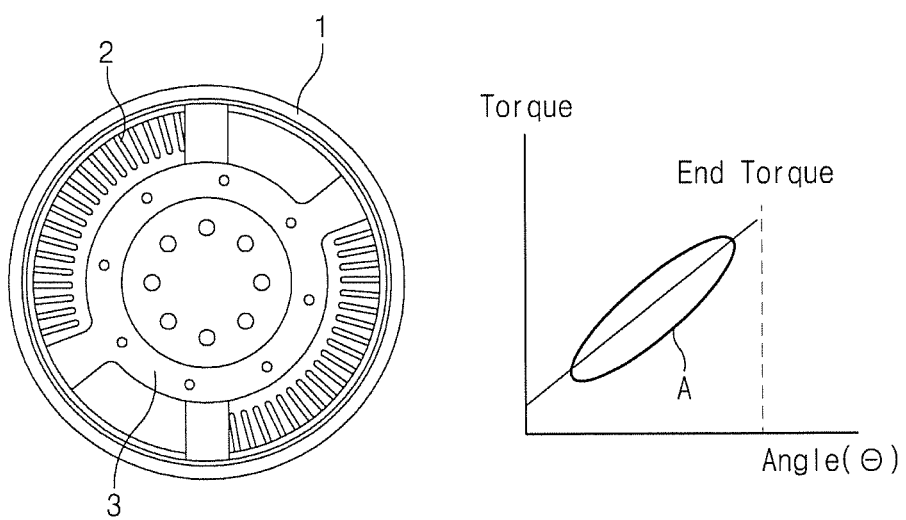
FIG. 1 is a graph of a torque angle and states of main components in an operating state of a conventional dual mass flywheel.
Figure 2:
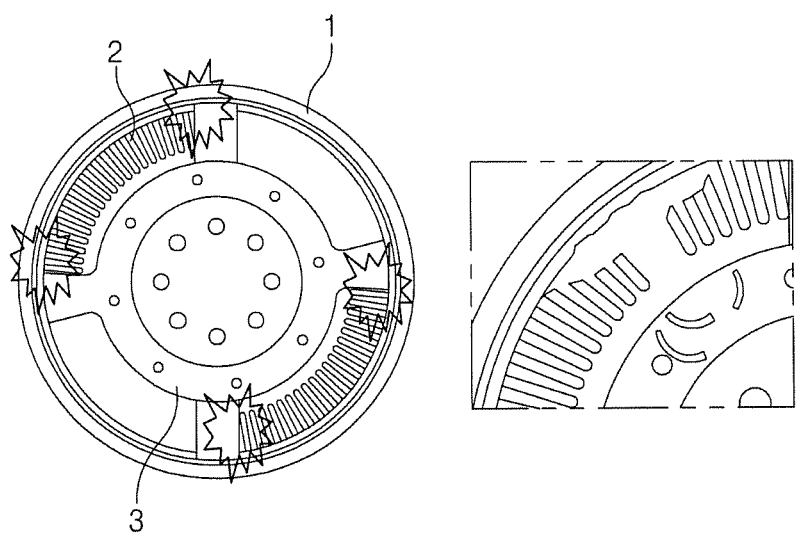
FIG. 2 is a diagram illustrating other states of main components in an operating state of a conventional dual mass flywheel.

Hereinafter, exemplary embodiments of the present disclosure will be described in detail with reference to the accompanying drawings.

As illustrated in FIGS. 3 to 6, a dual mass flywheel according to the present disclosure includes a first arcspring 110 and a second arcspring 120 that are symmetrically mounted along an inner circumference of a primary cover 100 connected to a crankshaft, a flange 200 inserted into the primary cover 100 and including a first compressor 210 and a second compressor 220 formed therein, which contact the first arcspring 110 and the second arcspring 120, respectively, a first stopper 310 and a second stopper 320 that support the first arcspring 110 or the second arcspring 120 and are formed on the inner circumference of the primary cover 100, and a first guide shell 410 and a second guide shell 420 that are disposed on the inner circumference of the primary cover 100, guide deformation of the first arcspring 110 or the second arcspring 120 in a radial direction, and include a friction inducer 400 that contacts the first compressor 210 or the second compressor 220.

Figure 3:
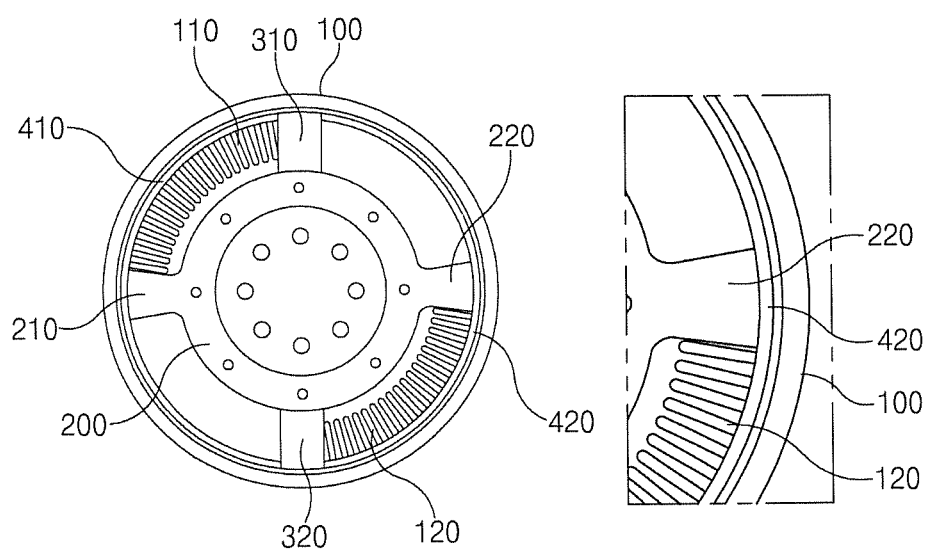
FIG. 3 is a front view of main components of a dual mass flywheel according to a first embodiment of the present disclosure.
Figure 4:
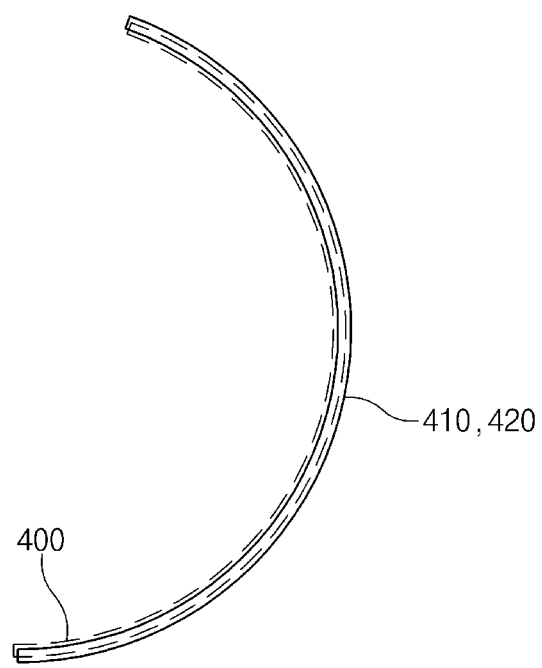
FIG. 4 is a perspective view of a guide shell included in the dual mass flywheel of FIG. 3.

As illustrated in FIGS. 3 and 4, the friction inducer 400 according to a first embodiment of the present disclosure has a thickness that is gradually increased from one end of the first guide shell 410 or the second guide shell 420 toward the other end.

In addition, the first guide shell 410 or the second guide shell 420 may have an internal surface with an oval shape.

Since the internal surface of the first guide shell 410 or the second guide shell 420 has an oval shape with a curvature, this affects the flange 200 across an entire area of the first guide shell 410 or the second guide shell 420.

Figure 5:
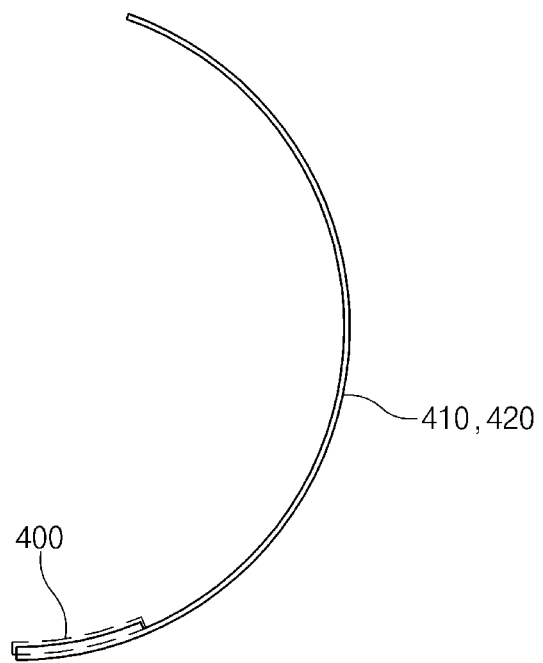
FIG. 5 is a perspective view of a guide shell included in a dual mass flywheel according to a second embodiment of the present disclosure.

As illustrated in FIG. 5, the friction inducer 400 according to a second embodiment of the present disclosure protrudes toward a center of the primary cover 100 from the first guide shell 410 or the second guide shell 420.

The friction inducer 400 protrudes from a predetermined portion of the first guide shell 410 or the second guide shell 420, which is adjacent to the first stopper 310 or the second stopper 320.

In this case, the friction inducer 400 may contact the first stopper 310 or the second stopper 320.

When the end torque at which the arcspring 2 is compressed to limit is generated, the friction inducer 400 has a different thickness only on a predetermined portion of the first guide shell 410 or the second guide shell 420, which contacts the flange 200, from other portions, and thus friction may be generated only when the end torque is generated, thereby preventing the arcspring 2 from being damaged.

Figure 6A:
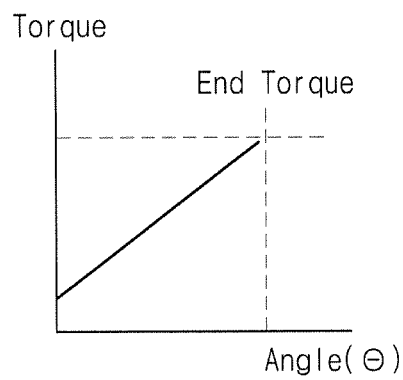
FIGS. 6A, 6B and 6C are graphs showing relationship between torque and angle of a dual mass flywheel according to the present disclosure.
Figure 6B:
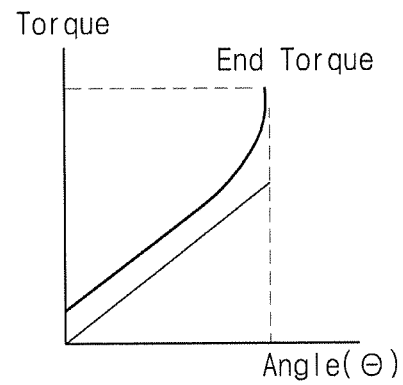
Figure 6C:
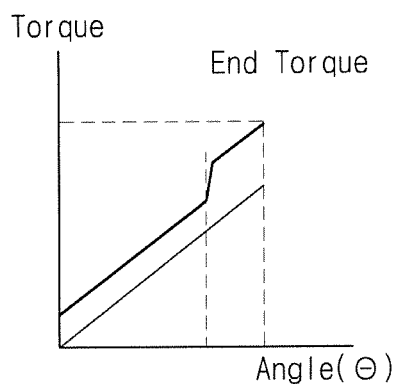

FIG. 6A shows linear change in torque by a conventional arcspring. FIG. 6B shows linear change in torque by the arcspring 2 according to the first embodiment of the present disclosure and nonlinear change in torque by friction torque of the flange 200 and the first guide shell 410 or the second guide shell 420. FIG. 6C shows linear change in torque by the arcspring 2 according to the second embodiment of the present disclosure and nonlinear change in torque by friction torque of the flange 200 and the first guide shell 410 or the second guide shell 420.

As illustrated in FIGS. 6A-6C, friction between the flange 200 and the first guide shell 410 or the second guide shell 420 is increased and the torque at the end torque point of time at which the arcspring 2 is maximally compressed is increased compared with prior art.

Thus, as the friction between the flange 200 and the friction inducer 400 formed on the first guide shell 410 or the second guide shell 420 is generated, impact that damages the arcspring 2 is not generated in the arcspring 2 even with a sudden change in torque in the engine.

As described above, according to the exemplary embodiments of the present disclosure, the dual mass flywheel may prevent friction from being generated between a flange and a guide shell by a friction inducer and prevent impact that damages an arcspring from being generated.

Although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A dual mass flywheel comprising:
 a first arcspring and a second arcspring being symmetrically mounted along an inner circumference of a primary cover connected to a crankshaft;
 a flange being inserted into the primary cover and including a first compressor and a second compressor formed therein, which contact the first arcspring and the second arcspring, respectively;
 a first stopper and a second stopper configured to support the first arcspring or the second arcspring and being formed on the inner circumference of the primary cover; and
 a first guide shell and a second guide shell, which are disposed on the inner circumference of the primary cover, guide deformation of the first arcspring or the second arcspring in a radial direction, and include a friction inducer that contacts the first compressor or the second compressor.

2. The dual mass flywheel according to claim 1, wherein the friction inducer has a thickness that increases from one end of the first guide shell or the second guide shell toward another end.

3. The dual mass flywheel according to claim 1, wherein the first guide shell or the second guide shell has an internal surface with an oval shape.

4. The dual mass flywheel according to claim 1, wherein the friction inducer protrudes toward a center of the primary cover from the first guide shell or the second guide shell.

5. The dual mass flywheel according to claim 4, wherein the friction inducer protrudes from a predetermined portion of the first guide shell or the second guide shell, which is adjacent to the first stopper or the second stopper.

* * * * *